April 21, 1964           D. S. COX           3,129,496
METHOD OF PRODUCING IMPROVED VEHICLE WHEELS
Filed Dec. 8, 1959           12 Sheets-Sheet 1

INVENTOR.
BY *Darwin S. Cox*

INVENTOR.

BY Darwin S. Cox

April 21, 1964  D. S. COX  3,129,496
METHOD OF PRODUCING IMPROVED VEHICLE WHEELS
Filed Dec. 8, 1959  12 Sheets-Sheet 3

INVENTOR.
BY  *Darwin S. Cox*

April 21, 1964  D. S. COX  3,129,496
METHOD OF PRODUCING IMPROVED VEHICLE WHEELS
Filed Dec. 8, 1959  12 Sheets-Sheet 4

FIG. 9

INVENTOR.
BY Darwin S. Cox

D. S. COX 3,129,496

METHOD OF PRODUCING IMPROVED VEHICLE WHEELS

Filed Dec. 8, 1959

INVENTOR.

BY Darwin S. Cox

April 21, 1964     D. S. COX     3,129,496
METHOD OF PRODUCING IMPROVED VEHICLE WHEELS
Filed Dec. 8, 1959     12 Sheets-Sheet 9

INVENTOR.
BY *Darwin S Cox*

FIG. 16

INVENTOR.
BY Darwin S. Cox

INVENTOR.
BY Darwin S. Cox

United States Patent Office 3,129,496
Patented Apr. 21, 1964

3,129,496
METHOD OF PRODUCING IMPROVED
VEHICLE WHEELS
Darwin S. Cox, 10712 S. Bell Ave., Chicago 43, Ill.
Filed Dec. 8, 1959, Ser. No. 858,216
5 Claims. (Cl. 29—159.01)

The invention relates to an improved vehicle wheel and a method of manufacturing same from a cylindrical blank. More particularly it relates to wheels having rims of varying cross-sectional thicknesses and disks of generally tapering thickness outwardly from the mounting section.

Although the present application makes a full disclosure of the new and improved wheel per se, only the method of making the wheel is claimed herein. The improved wheel per se was claimed in a copending application of Darwin S. Cox, Serial No. 57,101, filed September 7, 1960, now abandoned.

Current wheels of the type here under consideration consist of a tapered disk which is made from steel plate and a rim which is separately formed and cylindrically shaped to a desired cross-sectional configuration. The rim and disk are assembled and held together by rivets or welds. This makes it necessary to use extra material in the disk to provide same with a depth of flange that will extend into the central portion of the rim and afford sufficient area of contact with the rim for riveting or welding. This extra material in the disk adds weight to the finished wheel. The shape of the disk of these two piece wheels also decreases the air space around the brake drums and thereby reduces brake drum cooling efficiency.

Accordingly, it is a primary object of the invention to provide a manufacturing method which results in an improved wheel, including the rim and the central disk, from a generally cylindrical blank which may be formed from a wrapped and welded rectangular plate.

It is a further object of the invention to provide a method for producing an improved wheel which eliminates the rivets or welds required in the assembly of the present two piece designs, thereby avoiding wheel failure or air leakage which often occurs when welds or rivets fail or break in such prior art structures.

It is a further object of the invention to provide a method of producing a wheel of reduced weight but of equal or greater strength.

It is an additional object of the invention to provide in the manufacture of a complete wheel, of the type described, economies of manufacture due to a reduction in raw material used, reduction in trim scrap or waste, and less handling or labor.

It is a still further object to provide a method of manufacturing a wheel which provides increased air space and air turbulence around the brake drum for more efficient cooling.

These and other objects of the invention will become apparent in the course of the following descriptions and an examination of the associated drawings, wherein.

Figure 1:
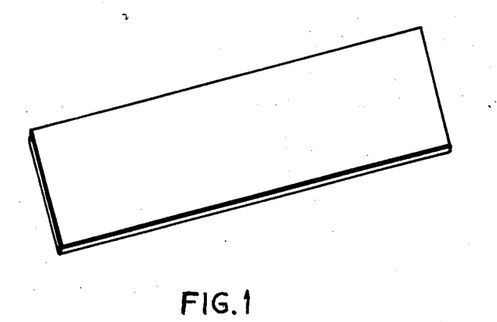
FIGURE 1 illustrates a rectangular metal plate of uniform thickness and predetermined size.
Figure 2:
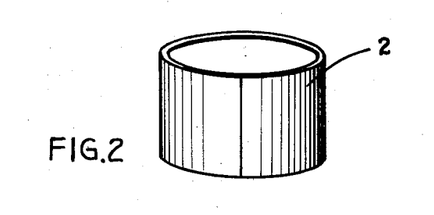
FIGURE 2 illustrates a metal cylinder formed from the flat rectangular plate shown in FIGURE 1, welded, normalized and trimmed.

Describing the invention in detail and considering FIGURE 2 it will be noted that a cylinder 2 may be provided, said cylinder usually being formed by wrapping and welding abutting ends of the plate in FIGURE 1. Thereafter the excess weld metal is trimmed and the blank or weld area may be normalized.

Figure 3:
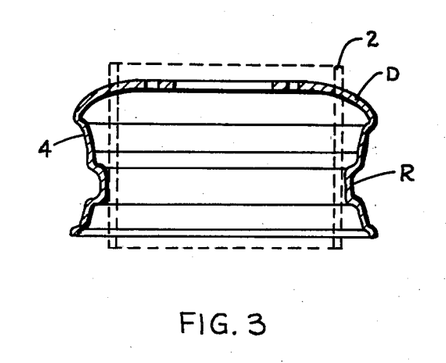
FIGURE 3 is a cross-sectional view of a typical drop center type wheel formed from the illustrated superimposed blank.

The cylinder 2 with a drop center type wheel 4 superimposed thereon is shown in FIGURE 3. In FIGURE 3 the letter R indicates the rim portion and D indicates the disk portion. The wall of the cylinder 2 that is employed should be at least as thick as the thickest point in the final rim portion R and the cylinder diameter preferably as small as or less than the inside diameter of the central portion of rim R.

Figure 4:
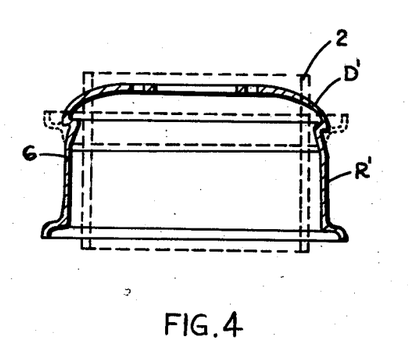
FIGURE 4 is a cross-sectional view similar to FIGURE 3 but showing a complete wheel of the locking ring type.

FIGURE 4 illustrates a complete wheel 6 of the locking ring type which may be manufactured by this process. It will be noted that the locking ring 8 illustrated in phantom is a separate and added part in this type of wheel. The addition of such locking ring will not be given further attention. Here again the wall of the cylinder is at least as thick as the thickest cross-section of the rim R'. The diameter of the cylinder is shown to be less than the diameter of the rim R'. D' indicates the area hereinafter referred to as the disk portion.

Figure 5:
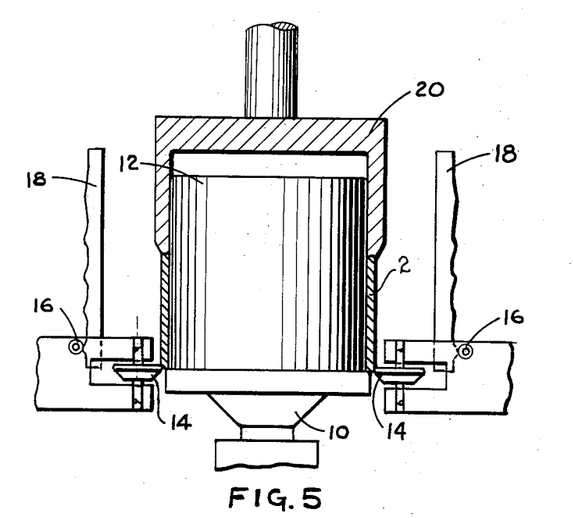
FIGURES 5 and 6 are elevational views partly in section illustrating a first step in the method disclosed.

Turning to FIGURE 5 it will be seen that a rotating chuck 10 having a mandrel 12 is arranged to receive there-over cylinder 2. One or more rollers 14 are provided and are guidably moved by the action of followers 16 riding on cams 18 and starting at or near the lower end, rollingly engage the outer surface of the cylinder blank to provide in the wall thereof varying thicknesses at predetermined areas in the wall. The pressure contact of the rollers variably thins the metal under the control of the cams 18 as they progress from one end of the cylinder to the other. The metal being displaced by the thinning action causes the cylindrical blank to increase in length and a pressure yielding clamp ring 20, which engages the upper end of the cylindrical blank 2, accommodates the lengthening thereof.

Figure 6:
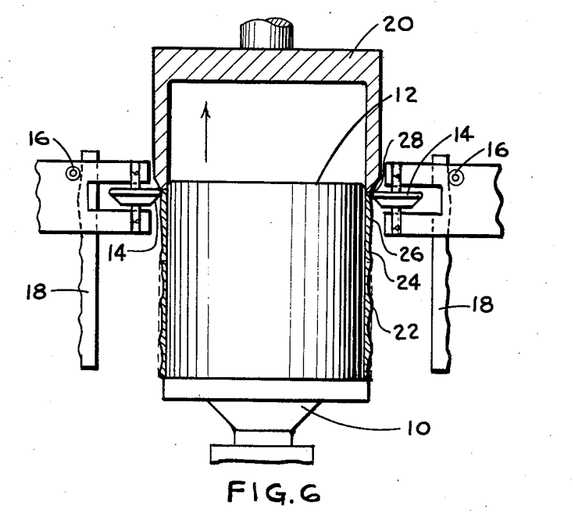

FIGURE 6 shows the rollers 14 at the completion of their cycle. The cylinder, now indicated at 22, has been increased in length and provided with a wall of varying cross-sectional area.

Particularly attention should be given to the thinning action at the upper end of the cylinder 22 which is to become the portion from which the disk section D or D' noted above is formed. Because the desired final form of the wheel requires a central annular bolting section of uniform thickness, having an annular taper thinned section flaring radially outward therefrom, it is desirable to controllably change the cross-sectional area of this portion of the cylinder into a predetermined reverse taper. For example, a tapered section beginning at the point 24 of desired minimum wall thickness is formed to taper increase in thickness to a point 26. Thereafter the direction of the taper is reversed until a desired taper thinning is reached at the very edge of the cylinder as at point 28. The purpose of this particular operation will hereinafter be described in detail.

Figure 7:
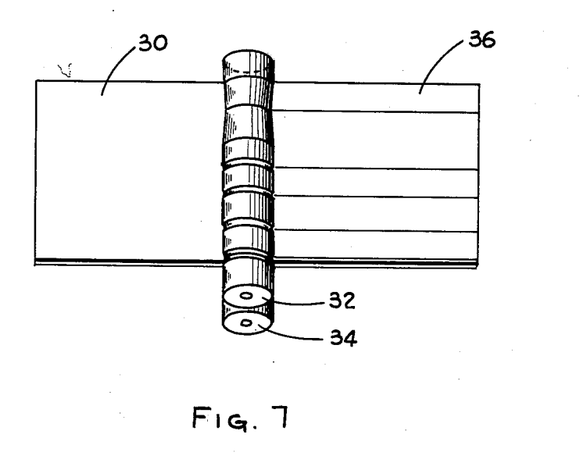
FIGURE 7 is a perspective view illustrating an alternate step which may be employed, FIGURE 7-A is an end view of a plate formed with the step of FIGURE 7.
Figure 7A:
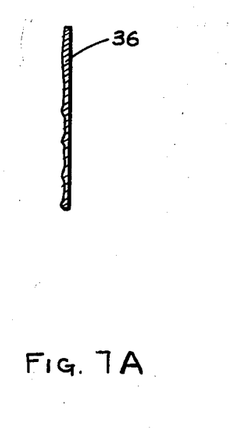
Figure 8:
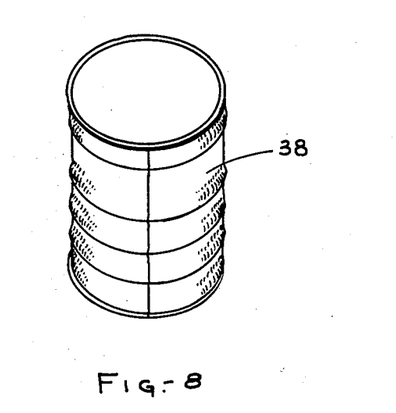
FIGURE 8 is a perspective view illustrating a cylinder formed from alternate step employed in FIGURE 7.

FIGURES 7 and 8 teach an alternate method of producing the varying cross-section in the wall of the cylinder. Here a flat blank 30 of uniform thickness is run between mill rolls 32 and 34. Roll 32 is provided with a variable surface configuration whereby the plate, during rolling, is changed to the desired varied thickness 36 as seen in sectional view FIGURE 7–A.

FIGURE 8 illustrates a variable wall thickness cylinder 38 rolled and welded from rolled strip 36 into a desired cylinder.

The steps shown in FIGURES 1, 2, 5 and 6 are considered the preferred method as the welded area is refined during the rolling operation of FIGURES 5 and 6, and because of the greater amount of special tooling and equipment required to produce a cylinder by the steps shown in FIGURES 7 and 8.

After producing the cylinder with the varied wall thickness in accordance with FIGURES 5 and 6 or 7 and 8 it may be desirable to anneal the cylinder before further forming operations are performed. This will depend largely on the amount of cold working which occurs while producing the varied thickness required in a particular wheel design.

Figure 9:
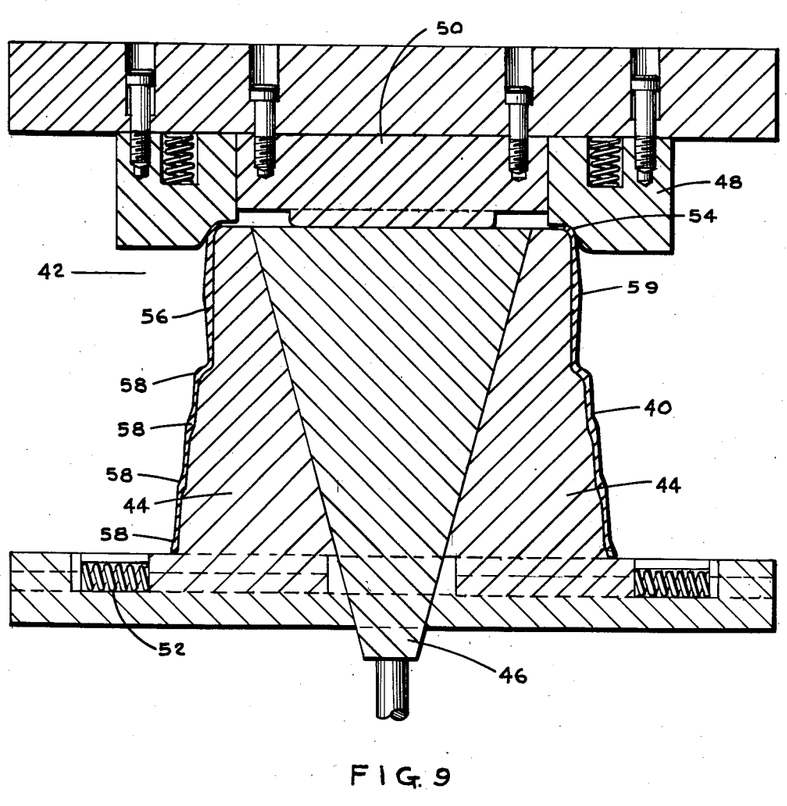
FIGURE 9 is an elevational view partly in section and showing a next operation employed in the method disclosed.

Turning to the showing of FIGURE 9, the previously formed cylinder 22 or 38 with its varying wall thickness is expanded as indicated at 40 on a conventional segmented expanding device indicated generally at 42. The device 42 comprises a plurality of segments 44, 44 arranged about a central wedge 46 and over which is positioned the cylinder. The spring loaded collar 48 of the upper die holds the blank from shifting upwardly. The die member 50 pushes the wedge 46 downwardly causing the segments 44 to move radially outwardly against springs 52 to expand the substantial portion 40 of the cylinder length to a predetermined stepped conical shape, and the remaining upper portion 56 of the cylinder, if desired, is slightly cylindrically expanded to properly size the blank for subsequent operations. In this operation it may be desirable to slightly pre-curl the upper end of the blank inwardly by having a radius on die member 48 as shown at 54. This facilitates the subsequent curl operation. The thick areas of the cylinder are shown in cross-section at 58. The thickest point of the tapered thickness cylindrical portion is shown at 59.

Figure 10:
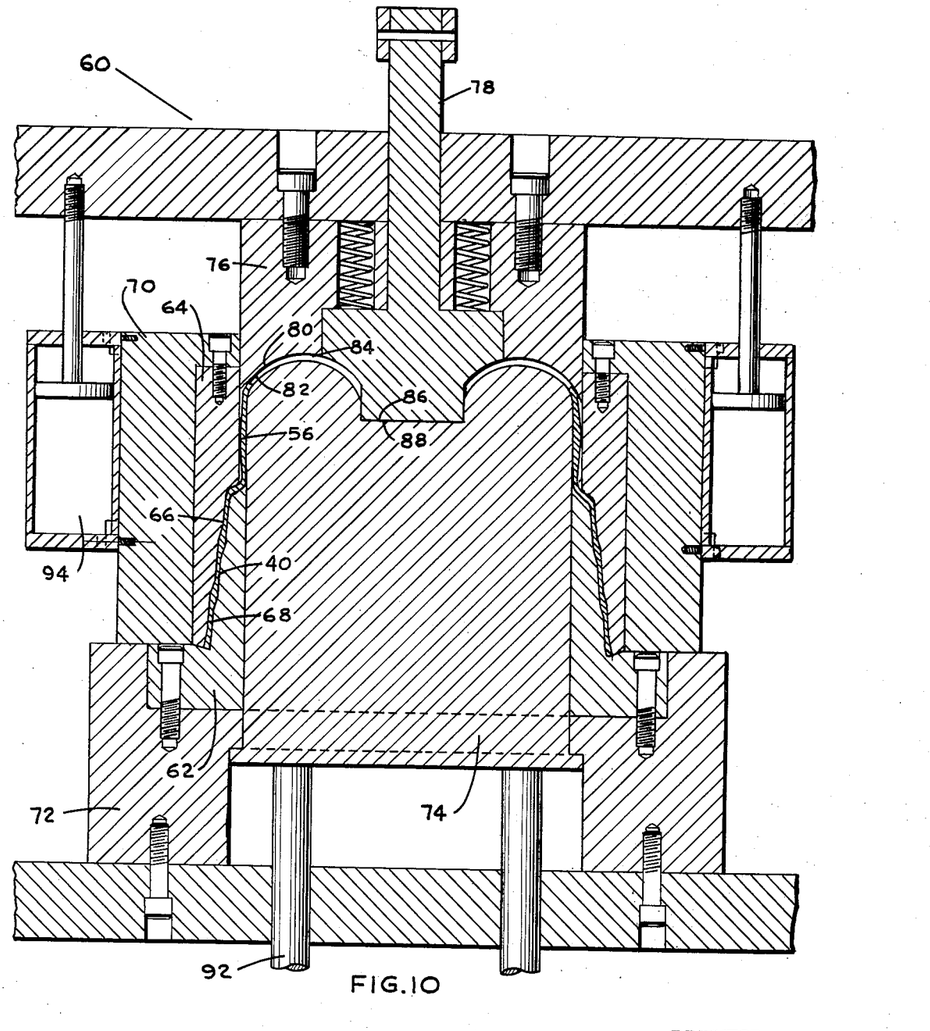
FIGURES 10 and 11 are elevational views partly in section illustrating a step of curling and gathering here employed.
Figure 11:
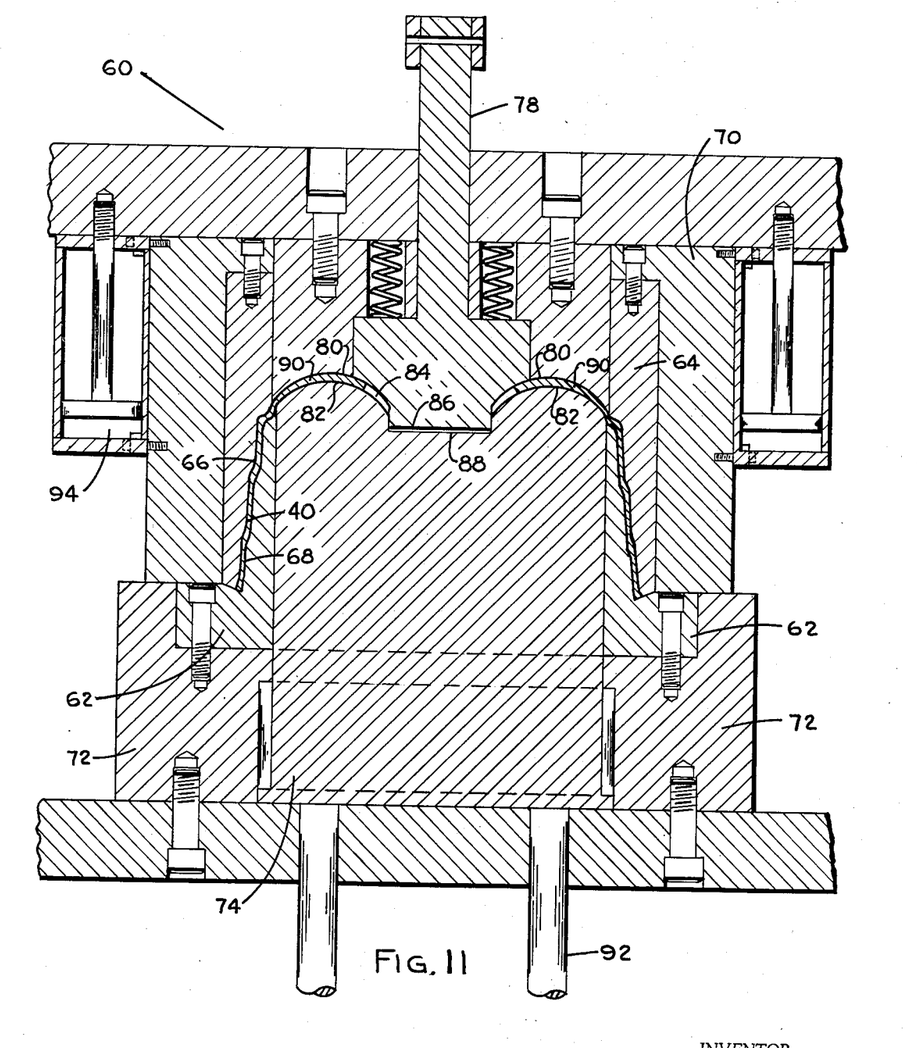

FIGURES 10 and 11 illustrate the steps of curling and gathering here employed. In this arrangement the die, indicated generally at 60, receives the step expanded portion 40 over the section 62 which is of stepped conical form 68 to accommodate an intimate overall surface association therewith. A ring section 64 is provided with an inner surface 66 contoured to complementally engage the outer surface of the expanded portion 40. The upper portion 56 of the blank is cylindrically received between the inner cylindrical surface of ring section 64 and section 74.

It would be noted that all the stepped and slightly conical die surfaces 66 and 68 of the die members 62 and 64 are so designed as to hold and closely confine the inner and outer surfaces of the expanded portion 40 and prevent the material from tightly locking to the surfaces 66 and 68.

Figures 14, 15:
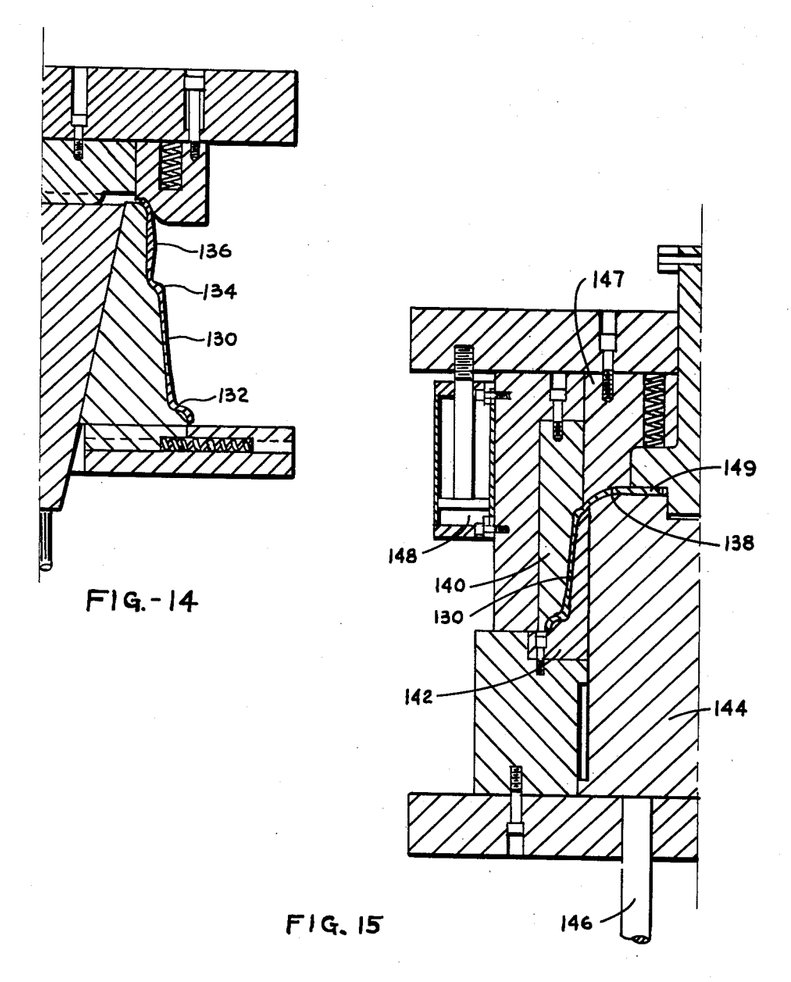
FIGURE 14 is a quarter sectional view of the operation similar to FIGURE 9 being performed on a locking ring type of wheel.
FIGURE 15 is a quarter sectional view of the steps of curling and gathering, similar to view in FIGURE 11, being performed on a locking ring type wheel.

In this operation the section 74 engages pressure pins 92. At the upper edge of the die section 74 an annular arcuate cavity 84 is defined by surfaces 80 and 82 of die members 76 and 74. The cavity 84 accommodates the curling action hereafter described. This cavity can be of various determined shapes curving inward and toward the center. One such alternate shape is shown in FIGURE 15.

After the expanded portion 40 is positioned on the member 62 the surface 66 of member 64 is brought into confining contact with the outer surface of the blank as the die member 70 comes to a fixed position against member 72. The cylinders 94 maintain a yielding pressure on die member 70 while the remaining upper segment 76 of the upper die continues to move downwardly causing the material in the remaining cylindrical portion 56 of the blank to curl inwardly between the surfaces 80 of the upper die member 76 and the surface 82 of the pressure yielding member 74 thereby filling the cavity 84. The finish of the curl is shown in the view of the die in closed position in FIGURE 11.

At the start of the curl operation the arcuate curved die surfaces 82 and 80 are held in spaced relation by the contacting surfaces 86 and 88 so that the material can start to enter the cavity 84. As the curl progresses the material gathers and thickens forcing the space between the surfaces 82 and 80 to widen and surfaces 86 and 88 become separated. This described action together with the controlled yielding pressure of cushion pins 92 helps to maintain an ironing action on the material being curled and gathered inward and thereby avoids wrinkles or other distortion in this portion being curled. It will be understood that firmly confining the expanded portion 54 prevents distortion in this area while the uniform curling and gathering described above is taking place.

When the die opens knockout member 78 pushes against the outer surface of the inwardly curled and gathered portion 90 and clears the part from the upper die. Cushion pins 92 lift die member 74 so that the part is lifted and left loosely seated on the inner surface of the curled portion 90, ready for removal from the die.

It will also be understood that the previously mentioned reversed tapering, done during the earlier described operation of rolling the cylinder to varied thickness, to the end of the cylinder which is now curled inward, accommodates the forming of an inner thickened portion of uniform thickness and the flared tapered section extending annularly there around. The purpose of this arrangement will be more clearly understood when consideration is given to the subsequent final forming operations to obtain the desired wheel cross-sectional configuration.

In order to obtain the best physical strength in the material and facilitate forming in subsequent die operations, it may be found desirable to do the curling described above and shown in FIGURES 10 and 11, in progressive steps. As an example, the part could first be curled to within approximately 25 to 35 percent of the required finished center hole diameter, then this curled area or the entire part, if desired, could be annealed. The part could then again be placed in the curl die and the material curled and gathered the remaining distance. When using certain grades of steel it has been found that this method will greatly increase the physicals in the disk and mounting areas and permit a reduction in metal thickness throughout. Of course this again is largely dependent on the design of the product and the cold working occurring during the forming operations.

Figure 12:
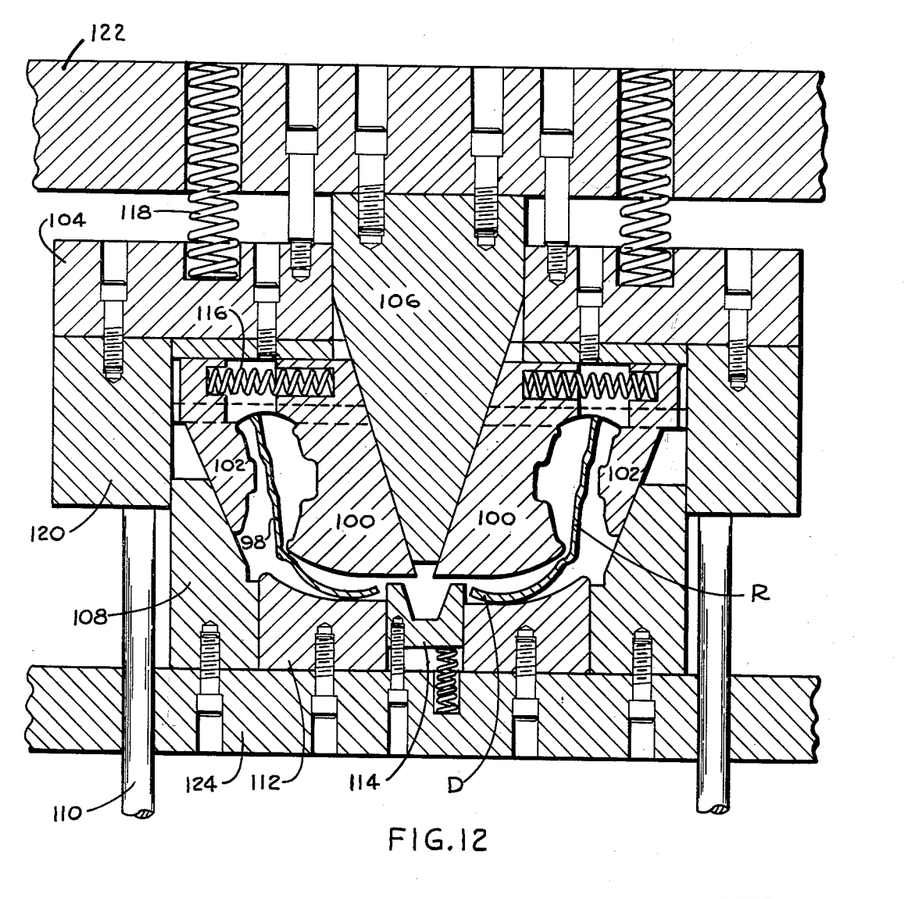
FIGURES 12 and 13 are elevational views partly in section illustrating a step that may be employed in the manufacture of a drop center type wheel for tubeless tires.
Figure 13:
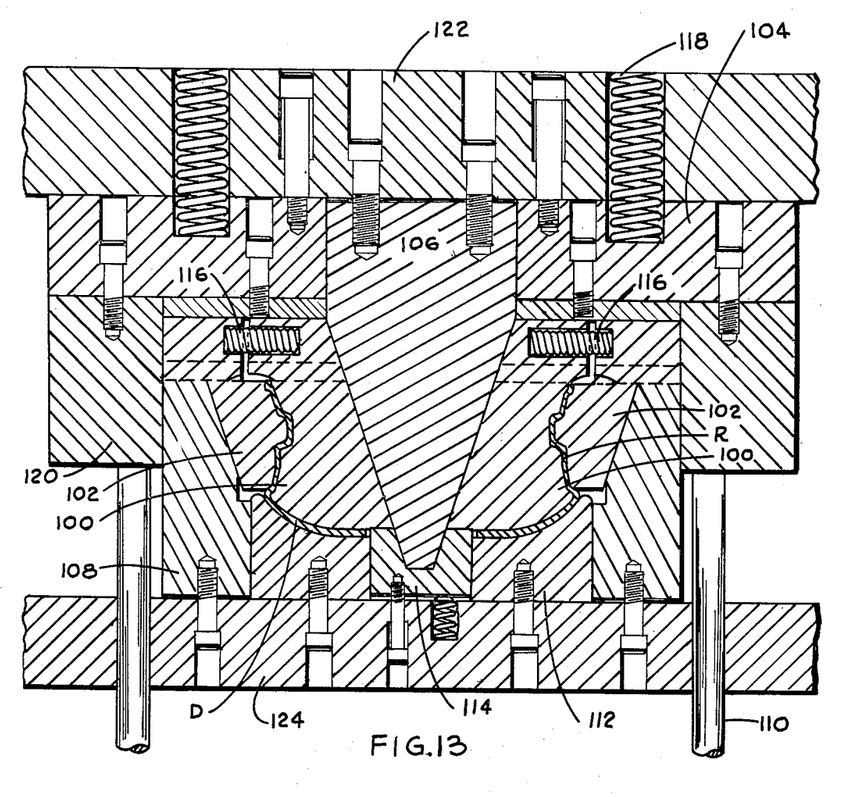

Turning now to FIGURES 12 and 13 which illustrate a next forming operation on the drop center type wheel shown in FIGURE 3. Here the expanded and curled blank is inverted and placed in a die so that the inner edge of the curled portion locates around a spring loaded ring 114 and rests on lower die member 112 attached to lower die plate 124. The upper die is made up of a plurality of radially arranged sliding die segments 100 and 102. These die segments 100 and 102 are slidably carried by movable die member 104 attached to upper die plate 122. As the die closes on the part 98 segments 100 are moved radially outwardly by the wedge action of the member 106 to cooperate with sliding die segments 102, which are moved radially inwardly by cam ring 108, to form the rim section R of the wheel. At the same time segments 100 cooperate with member 112 to form the disk portion D. Cushion pins 110 are used to help control the movement of the upper movable die member 104 to which all the radially sliding segments are attached. By this arrangement the outward movement of the inner expanding segments 100 can be properly timed with the inward movement of the outer sliding segments 102. Springs 116 help to return movable die segments 102 and 100 to open position. Springs 118 help to return movable die member 104. Ring 120 helps to keep all parts of the die centered and adds support to the outer wedge ring 108 while the die is closing.

The methods of producing a cylinder of varied wall thickness for the locking ring type of wheel would be the same as outlined in FIGURES 5 and 6 or 7 and 8 for the tubeless type wheel. The only difference being in the relative location of the thick and thin areas. Figures showing this rolling of the cylinder for the locking ring type wheel have therefore been omitted.

The methods used for taper expanding and curling and gathering are also the same for the locking ring type wheel as for the tubeless type. However, the shape of die segments would be a little different and FIGURES 14, 15, 16 and 17 describe the type of tools which may be used in the forming of the locking ring type of wheel.

FIGURE 14 is a quarter sectional view of an operation on a locking ring type wheel which is similar to the operation shown for a tubeless type in FIGURE 9. Here the previously formed cylinder with its varying wall thickness for the locking ring type wheel is expanded as at 130. The thick areas of the locking ring type wheel would generally be at 132 and 134 as shown in cross-section. The shape of the expanded areas again being of such stepped conical design as to prevent locking in the die during the subsequent curling and gathering operation. The thickest point of the tapered thickness in the remaining cylindrical portion is indicated in cross-section at 136.

FIGURE 15 is a quarter sectional view of a similar operation to that shown in FIGURE 11. Here while the expanded portion 130 of a part for the locking ring type wheel is firmly held between the die surfaces of die members 142 and 140 the remaining cylindrical portion of the part was curled inward and toward the axis as shown at 138. Again, as described in detail in connection with FIGURES 10 and 11, the pressure yielding arrangement of die member 144 on cushion pins 146 helps to maintain an ironing pressure on the surface of the material being curled and gathered inward by die member 147.

The shape of the space into which the metal is curled and gathered is somewhat different in this FIGURE 15 and after curling inward in an arc the material proceeds in a more direct line toward the axis as shown at 149. This is an alternate shape that can be used and it should be understood that the design of this die shape into which the metal is gathered for the disk section, for either the tubeless or locking ring type wheels, will largely be determined by the amount of reduction of diameter necessary, the over the surface length required from the center outward and the depth and shape required in the finished disk portion of the wheel.

Figure 16:
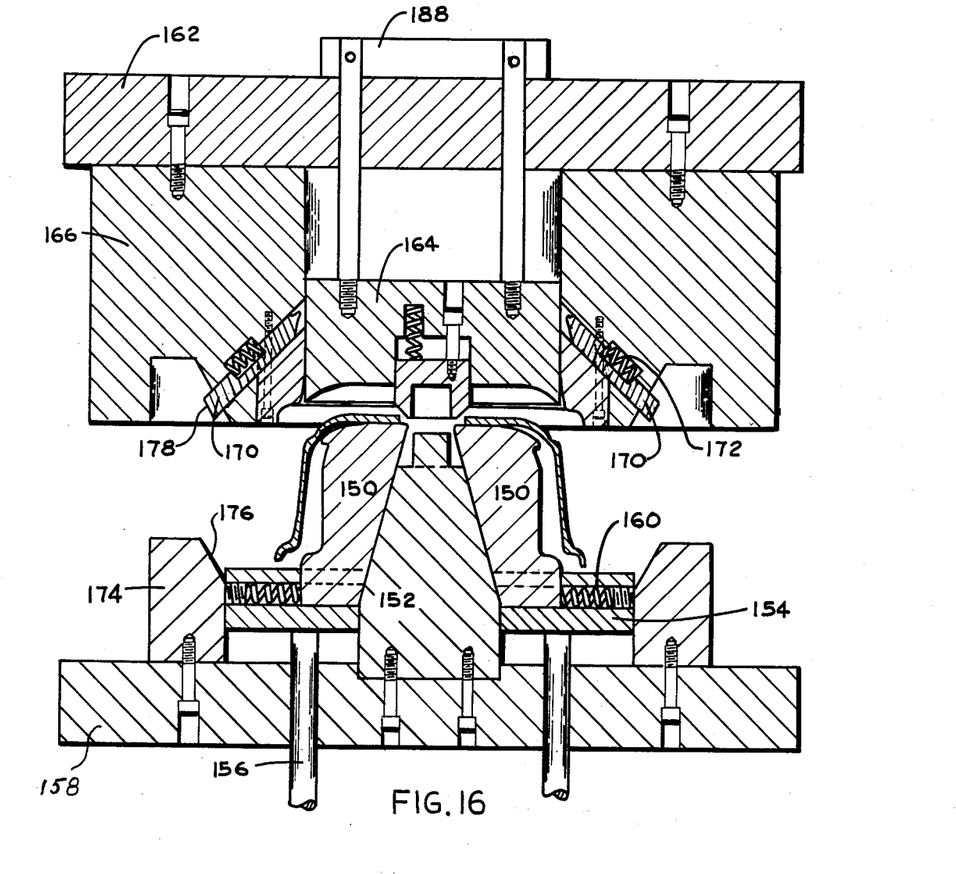
FIGURES 16 and 17 are elevational views partly in section illustrating a step in the manufacture of a locking ring type wheel.
Figure 17:
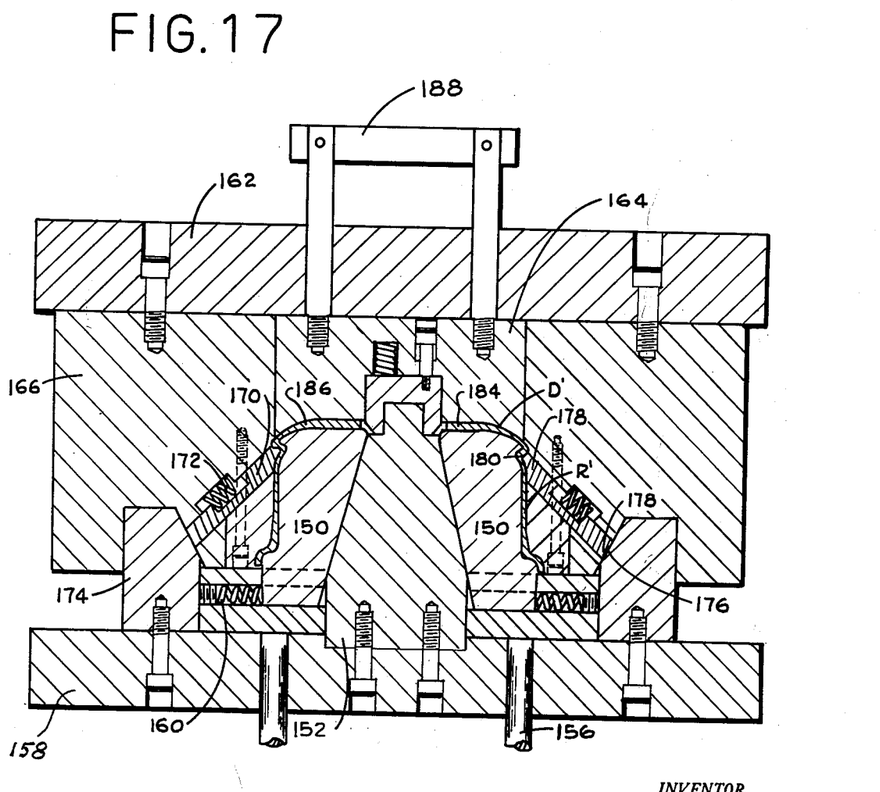

FIGURES 16 and 17 illustrate a somewhat similar die operation to that shown in FIGURES 12 and 13 except that here a wheel of the locking ring type shown in FIGURE 4 is being formed from the part formed in FIGURE 15. The action of the die is different than that shown in FIGURES 12 and 13 but it accomplishest the same result of expanding and shrinking various determined areas of the rim portion and forms the disk portion. In this arrangement a plurality of radially movable segments 150 are mounted to die member 154. Radially located springs 160 aided by cushion pins 156 hold the segments 150 in proper position against the central wedge member 152 which is mounted to lower die plate 158.

The upper die comprises an inner floating die segment 164 containing the desired shape of the outer surface of the disk portion D'. This floating die segment is attached to knockout bar 188 and is also used to push the finished part out of the upper die after forming. Around this floating member and attached to upper die plate 162 is a stationary member 166 containing radially spaced movable die segments 170 which are normally held in their outward retracted position by springs 172.

The piece part is positioned over and around the lower die segments 150. Upon die closing the cushion pins 156 continue to support the lower die member 154 until the upper die ring 166 has advanced down around the rim portion of the part to size same, and the curled portion of the part has forced the upper floating die segment 164 firmly against the upper die plate 162. Upon further downward movement of the upper die the supporting pressure of the cushion pins 156 is overcome by the upper ram pressure and sliding radial segments 150 are forced to expand outward by wedge segment member 152. At the same time the slope 176 of cam ring 174 engages the surface 178 of sliding segments 170, forcing them inward to form the peripheral groove 180 in the rim portion R'.

The closed die position of FIGURE 17 indicates the final form of the part. It will be noted that proper placement of the varying thicknesses produced in the cylinder wall in earlier operations provides thick portions for strength at the bend lines and groove of the rim section R', a thin portion for the more cylindrical areas of the rim portion R', the desired uniform thickness in the relatively flat central portion 184 of the disk D' and the adjoining annular area 186 radially tapering outward to where the disk portion D' joins the rim portion R'.

It may be found desirable to heat specific areas of the rim or disk portions of a wheel in order to facilitate the forming shown in FIGURES 12 and 13 or 16 and 17. As an example it may be found that the area of a locking ring type wheel, where the locking ring groove is formed will require much less pressure if heated and formed while hot. Or a specific area may be annealed and formed after it is cool.

Further sizing operations by slight machining or in rim rolls or dies can thereafter be performed on the part if necessary, and the bolt holes, hand holes, valve holes or slots may be pierced and chamfered as required in a specific design.

Figures 18, 19, 20, 21:
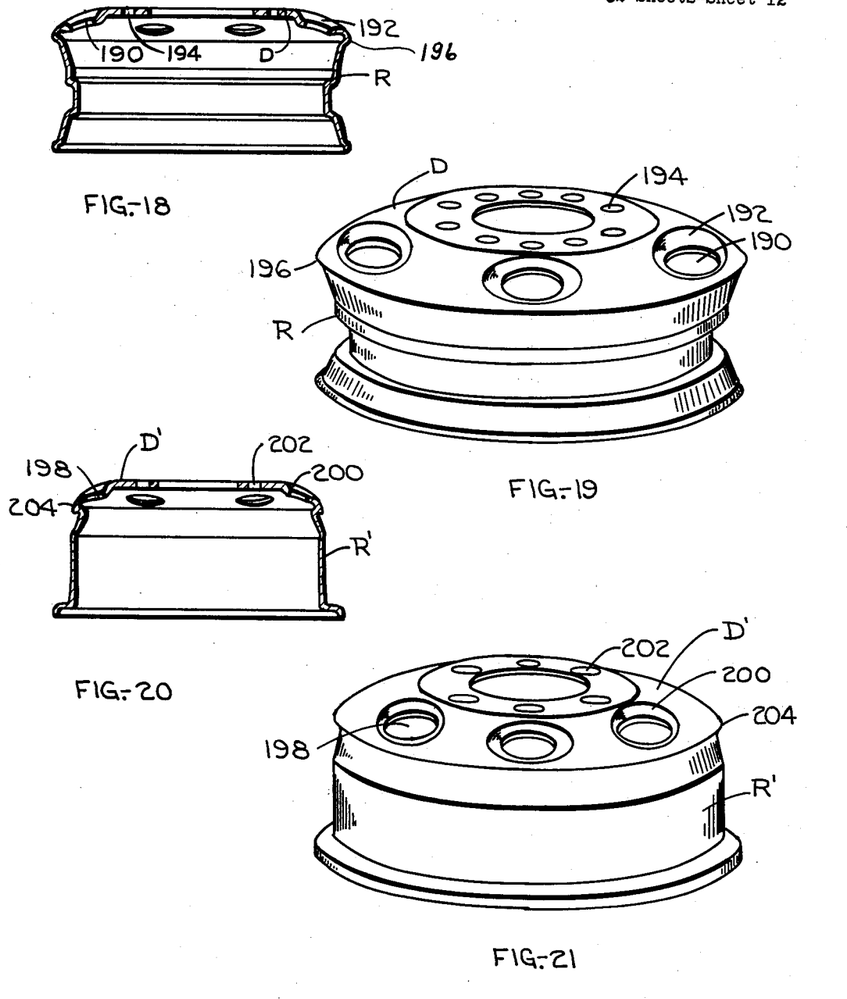
FIGURE 18 is a sectional view of a tubeless type wheel produced by this method, which shows formed handholes.
FIGURE 19 is a perspective view of the wheel with formed hand holes shown in section in FIGURE 18.
FIGURE 20 is a sectional view of a locking ring type wheel produced by this method, which shows formed handholes.
FIGURE 21 is a perspective view of the wheel with formed hand holes shown in section in FIGURE 20.

Since the shape of the disk for the one piece wheels produced by the method described and shown allows much greater clearance and air space around the vehicle brake drum, it is possible to further improve the fatigue strength of the wheel disk by forming the handholes inward as shown in cross-sectional views FIGURES 18 and 20 and perspective views FIGURES 19 and 21. At the same time this inwardly formed hand hole creates an irregular surface which will cause greater air turbulence around the brake drum for more efficient cooling of same.

Sectional view FIGURE 18 of a wheel for tubeless tires shows the hand holes 190 with the area 192 around the hand hole formed inward. Both holes 194 are shown in the central annular portion of the disk D. This view plainly shows how the outer edge of the disk portion also blends into the outer edge of the rim portion R, as shown at 196, and forms a part thereof.

FIGURE 19 is an enlarged perspective view of the complete wheel for tubeless type tires as shown in section in FIGURE 18.

FIGURE 20 is a sectional view of a locking ring type wheel for conventional tires which generally use inner tubes. Here hand holes 198 are shown formed inward as at 200 in the outer portion of the disk D' and bolt holes 202 are shown in the central annular mounting area. The outer edge of disk portion D' is shown blending into one outer edge of rim portion R' at 204 and forming a part of the rim.

FIGURE 21 is an enlarged perspective view of wheel shown in section in FIGURE 20.

The invention as shown and described is by way of illustration and not limitation and may be subjected to various modifications without departing from the spirit thereof or the scope of the appended claims.

What I claim is:

1. A method of forming a disk type vehicle wheel with integral tire supporting rim which comprises the steps of rolling a strip of metal between mill rolls of such determined surface configuration as to produce desired varied thicknesses throughout the strip width; said varied thicknesses being produced in the strip with a view to providing greater strength and thickness at the annular bend lines of the rim portion and desired thicknesses and tapers in determined areas of the disk portion of the wheel; thereafter cutting the strip to determined length, forming it into a cylinder with abutting edges, welding the abutting edges, trimming and normalizing the weld; radially expanding, by application of radially outward pressure, one end and a large portion of the axial length of the cylinder to a determined generally stepped and slightly conical form having its largest diameter adjacent said one end; said expanding so forming this portion of the cylinder, which later becomes the rim portion, as to place its thicker annular areas at the determined steps of the expanded portion and provide a shape which can be readily located and firmly held in position during subsequent forming, yet easily removable from subsequent forming die, then while firmly holding and confining the inner and outer surfaces of the expanded portion force the other end and remaining portion of the cylindrical blank to gather arcuately inwardly between pressure yielding die surfaces and into a plane generally surrounding and perpendicular to the axis of the cylindrical blank to reduce its diameter to within approximately 25% to 35% of the final desired center hole diameter, annealing the severely cold worked areas of the blank, then further gathering the material of said other end the remaining amount of approximately 25% to 35%, further forming the inwardly gathered portion and conically expanded portion to the desired wheel dimensions.

2. A method of forming a disk type vehicle wheel according to claim 1, wherein said gathering radially inwardly of said other end and remaining portion is accomplished in one inwardly gathering operation without the intermediate annealing.

3. A method of forming a disk-type vehicle wheel with integral tire supporting rim from a cylindrical blank, which comprises forming a rectangular plate of generally uniform thickness into a cylinder having abutting edges, welding the abutting edges, trimming and normalizing the weld, reducing the wall thickness desired amounts throughout determined annular areas of the cylinder by placing the cylinder over a mandrel, clamping the cylinder in place on the mandrel between one fixed member at one end and a pressure yielding member at the other end, rotating the cylinder and mandrel and starting at one end of the cylinder concurrently guidably and forcefully moving at least one roller over the surface to thin the wall of the cylinder in determined annular areas; the metal displaced by the rolling and thinning action thereby causing the cylinder to grow substantially in axial length and in turn forcing the pressure yielding clamp member to retract as the roller advances; said thinning of determined annular areas of the cylinder being done with a view to providing greater strength and thickness at the annular bend lines of the rim portion and desired thicknesses and tapers in determined areas of the disk portion of the wheel; radially expanding, by application of radially outward pressure, one end and a large portion of the axial length of the cylinder to a determined generally stepped and slightly conical form, having its largest diameter adjacent said one end; said stepped taper expanding so forming this portion of the cylinder as to place the thicker annular areas of same in determined relation to the steps of the expanded portion and provide a shape which can be firmly held in position between and easily removed from complementing inner and outer surfaces of subsequent forming die; then while holding and confining the inner and outer surfaces of the expanded portion force the other end and remaining portion of the cylinder to gather arcuately and radially inwardly between pressure yielding die surfaces and into a plane generally surrounding and perpendicular to the axis of the cylindrical blank, to thicken same and reduce the diameter of said other end to within approximately 25% to 35% of the final desired center hole diameter, annealing the severely cold worked areas of the blank, further gathering the material to desired center hole diameter, and further forming the inwardly gathered portion and conically expanded portion to desired wheel dimensions.

4. A method of forming a disk type vehicle wheel according to claim 3, wherein said gathering radially inwardly of said other end and remaining portion is accomplished to desired final inwardly gathered diameter in one gathering operation without the intermediate annealing.

5. A method of forming a taper disk type vehicle wheel including the tire receiving rim portion and the disk like mounting portion from one unitary blank, comprising providing a cylindrical blank of determined diameter and length having determined varying wall thicknesses and tapers in determined annular areas throughout said length; said varying wall thicknesses and tapers being provided in the wall of the cylinder with a view to providing greater strength and thickness at the annular bend lines of the rim portion and desired thicknesses and tapers in determined areas of the disk portion of the wheel; radially expanding, by application of radially outward pressure, one end and a substantial portion of the cylinder length to a generally stepped conical form of progressively increasing diameters toward said one end and with the largest diameter adjacent said one end; said stepped taper expanding so forming this portion of the cylinder as to facilitate holding and confining this portion during subsequent forming of the other end and remaining cylindrical portion; then while holding and confining the expanded portion force said other end and remaining cylindrical portion to progressively gather radially inwardly to reduce the diameter of said other end and substantially thicken the material therein, and further forming the inwardly gathered portion and conically expanded portion to desired wheel dimensions.

References Cited in the file of this patent

UNITED STATES PATENTS 1,865,185    Greenwald ____________ June 28, 1932

(Other references on following page)

UNITED STATES PATENTS

| | | |
|---|---|---|
| 1,979,815 | Wagenhorst | Nov. 6, 1934 |
| 2,160,975 | Matter et al. | June 6, 1939 |
| 2,247,002 | Rendelman | June 24, 1941 |
| 2,349,738 | Le Jeune | May 23, 1944 |
| 2,359,479 | Ingersoll | Oct. 3, 1944 |
| 2,406,062 | Cornell | Aug. 20, 1946 |
| 2,584,309 | Voorhees | Feb. 5, 1952 |
| 2,659,407 | Kay | Nov. 17, 1953 |
| 2,736,674 | Harmon | Feb. 28, 1956 |
| 2,848,279 | Parker | Aug. 19, 1958 |
| 2,983,033 | Cox | May 9, 1961 |
| 2,989,936 | Farnsworth et al. | June 27, 1961 |

OTHER REFERENCES

Welding handbook, 3rd ed., published by American Welding Society, 33 West 39th St., New York 18, N.Y., page 1250.

The Making, Shaping and Treating of Steel, published by United States Steel Corporation, 7th ed., page 390.